United States Patent [19]

Vitrac

[11] Patent Number: 4,549,785
[45] Date of Patent: Oct. 29, 1985

[54] STEREO VIEWER

[75] Inventor: Jean-Pierre Vitrac, Paris, France

[73] Assignee: Stereoscopes Lestrade & Cie., Hautes Pyrenees, France

[21] Appl. No.: 482,910

[22] Filed: Apr. 7, 1983

[30] Foreign Application Priority Data

Jan. 19, 1983 [FR] France .................. 83 00777

[51] Int. Cl.$^4$ ................... G02B 27/04; G02B 27/22
[52] U.S. Cl. ..................... 350/140; 40/365; 350/250
[58] Field of Search ............ 350/140, 135, 130, 133, 350/250; 40/365

[56] References Cited

U.S. PATENT DOCUMENTS

| 3,722,983 | 3/1973 | Brassington | 350/135 |
| 4,253,732 | 3/1981 | Carver | 350/140 |
| 4,357,073 | 11/1982 | Carver | 350/140 |

FOREIGN PATENT DOCUMENTS 1547722  10/1968  France.

Primary Examiner—John K. Corbin
Assistant Examiner—Scott J. Sugarman
Attorney, Agent, or Firm—D. Peter Hochberg

[57] ABSTRACT

A device for viewing a series of stereoscopic views disposed in pairs in columns on a card (S) comprises a generally flat rectangular body (9). A first pair of channels (14) on the front of the body, disposed on each side of an axis of symmetry of the body, is adapted to permit the card to slide therein. A hinged plate (16) carries eyepieces (30, 31) and is hinged (17 to 20) to form panels (21 to 25). An end panel (24) is attached to the body (9). The other end panel (25) is mounted so as to slide in the second pair of channels (15). The center and lateral panels (21, 22, 23) occupy either a deployed position in which the eyepieces (30, 31) lie in a plane parallel to and appropriately spaced from the front surface (10) of the body (9), in line with windows formed in the body, or a folded position in which the plate (16) lies flat against the front surface (10).

13 Claims, 5 Drawing Figures

U.S. Patent   Oct. 29, 1985   4,549,785
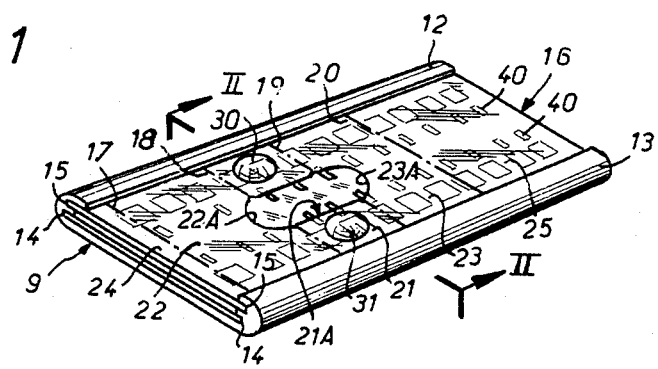
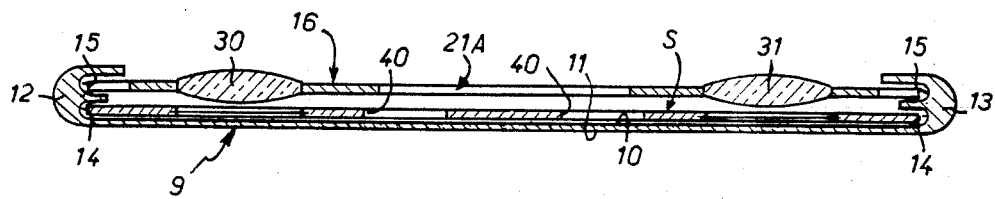
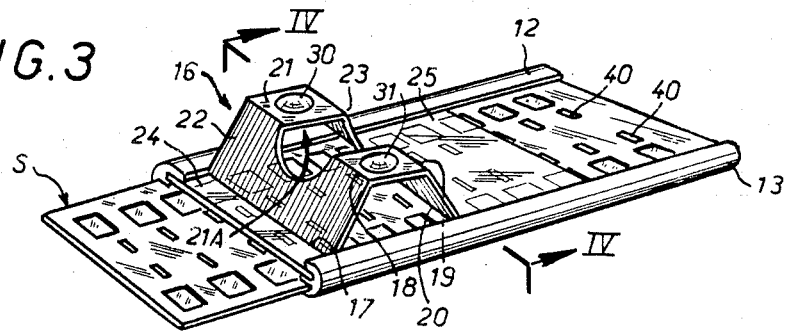
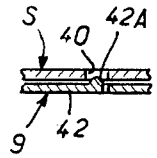
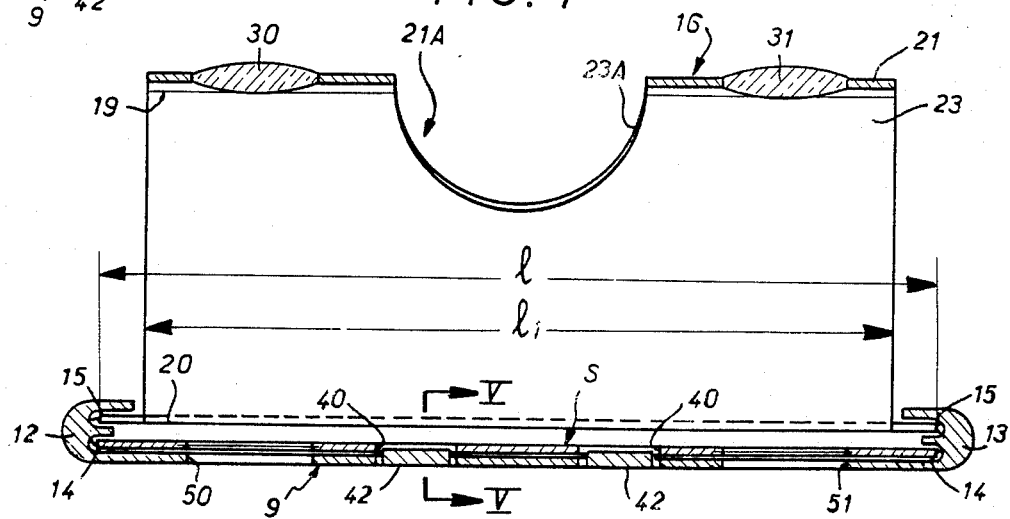

4,549,785

STEREO VIEWER

BACKGROUND OF THE INVENTION

1. Field of the Invention

The present invention concerns a device for viewing a series f stereoscopic views disposed in pairs on a card and constituting a "stereocard" known per se.

2. Description of the Prior Art

A stereocard comprises a relatively rigid support, of cardboard, for example, with which is associated a series of pairs of photographic views aligned in two columns opposite windows formed for this purpose in the support.

Devices for viewing stereocards of this kind have already been proposed, but the known devices have the disadvantage of being somewhat large. This results in difficulties with storage and in considerable expense when the devices must be shipped, these expenses arising primarily from the fact that it is necessary to provide appropriate packaging to secure adequate protection against shock during handling.

The present invention is intended to provide a device which is of simple and rugged construction and whose dimensions are significantly reduced as compared with currently known devices.

SUMMARY OF THE INVENTION

The invention consists in a device for viewing a series of stereoscopic views disposed in pairs in columns on a card, comprising a generally flat quadrangular body having an axis of symmetry, a pair of windows in said body, means defining a first pair of channels on the front of said body disposed one on each side of said axis of symmetry and adapted to permit said card to slide therein, a hinged plate, optical means on said plate consisting of two spaced eyepieces adapted to correspond to respective columns of views, and means defining a second pair of channels on the front of said body disposed one on each side of said axis of symmetry, superposed on said channels of said first pair of channels and adapted to permit at least part of said plate to slide therein, whereby said plate occupies either a deployed position in which said eyepieces lie in a plane parallel to and appropriately spaced from said front surface and opposite said windows, or a folded position in which said plate lies flat against said front surface.

Thus in the folded state the device constitutes a flat product, offering a number of advantages as compared with the prior art.

A first advantage consists in the fact that the device may be shipped by mail in an ordinary envelope, without any special packaging.

A second advantage relates to the considerably increased ease of storage, by virtue of the compact dimensions of the device when folded.

A third advantage is perceived by the user, since when not in use the device is easy to store, while being made ready for use virtually instantaneously by deployment of the plate supporting the optical system.

Otherwise stated, a device in accordance with the present invention overcomes many problems heretofore encountered with known devices.

Other objects and advantages will appear from the following description of an example of the invention, when considered in connection with the accompanying drawing, and the novel features will be particularly pointed out in the appended claims.

BRIEF DESCRIPTION OF THE DRAWING

FIG. 1 is a perspective view of a device in accordance with the invention in the folded state.

FIG. 2 is a view in transverse cross-section on the line II—II in FIG. 1.

FIG. 3 is a view analogous to FIG. 1, with the device in the deployed state.

FIG. 4 is a view in transverse cross-section on the line IV—IV in FIG. 3.

FIG. 5 is a partial cross-section on the line V—V in FIG. 4.

DESCRIPTION OF THE PREFERRED EMBODIMENT

In the embodiment selected and shown, the device in accordance with the invention comprises a generally flat profiled body 9 with a front surface 10 and a back surface 11. In the embodiment shown, body 9 is of rectangular shape as seen in plan view, with its two longitudinal edges formed by beads 12, 13 projecting from the front surface; each of the beads is formed with a pair of superposed channels 14 and 15 on its inside, so that the channels are disposed on respective sides of a longitudinal line of symmetry of profiled body 9.

The bottom channels 14 are adapted to permit a stereocard generally designated "S" and known per se to slide therein, whereas the top channels 15 are adapted to permit at least part of a plate 16 forming an optical system support to slide therein.

Note that a body of this kind is advantageously of a moldable material, and may be formed by sectioning an extruded strip.

The aforementioned optical system support plate 16 comprises hinge lines 17 to 20 extending transversely of the body and defining five panels 21 to 25, a center panel 21, lateral panels 22, 23 adjacent the center panel, and end panels 24, 25 adjacent the lateral panels.

The width "1" of end panels 24, 25 is such that they are engaged in top channels 15, whereas center panel 21 and lateral panels 22, 23 have a width "$1_1$" which is slightly less than the distance separating the inside edges of top channels 15.

In the embodiment shown, end panel 24 has its terminal parts fixed in top channels 15, whereas end panel 25 is mounted slidably in these channels.

Center panel 21 carries the eyepieces which in this instance consist of single lenses 30, 31 which are a snap-fit in two holes formed for this purpose in the panel, the lenses being separated by a distance corresponding to the average separation of the eyes and which also corresponds to the separation between the pairs of views mounted on the stereocard.

The aforementioned lenses may be attached to the panel in any appropriate manner, by means of a mutual interference fit or bonding, for example. Between aforementioned lenses 30, 31, center panel 21 is formed with an opening 21A which has parallel edges and which extends partially into lateral panels 22, 23 by virtue of substantially semi-circular cut-outs 22A, 23A; the opening thus formed is intended to accommodate the nose of the user.

The pairs of stereoscopic views must be correctly positioned in line with the lenses to obtain the desired result. In order to avoid fumbling in correctly positioning each pair of views opposite the eyepieces, the device in accordance with the invention comprises means adapted to bring about quick and correct positioning of said pairs of views.

To this end, stereocard "S" comprises, between the views of each pair, at least one opening adapted to cooperate with a tang formed in the body and having one end slightly projecting from the plane of the front surface 10 of the body. In the embodiment shown, stereocard "S" comprises, between the columns of stereoscopic views and between the views of each pair, two openings 40 on respective sides of the axis of symmetry of body 9, adapted to cooperate with a corresponding pair of tangs 42 formed in body 9, said tangs being elastically deformable and each having an end part 42A (see FIG. 5) adapted to enter openings 40 when these are presented in line with said end parts.

It will be understood that the correct position of stereocard "S" relative to eyepieces 30, 31 is thus readily obtained for each pair of views.

When not in use, the device is relatively compact by virtue of the fact that plate 16 is folded to lie substantially along the front surface 10 of the body.

The change from the non-use position of the device, as shown in FIG. 1, to an operating position is brought about virtually instantaneously, by causing end panel 25 to slide in channels 15 of the first pair, constituting a top slideway. During such sliding movement, transverse hinge lines 17 to 20 permit center panel 21 and lateral panels 22, 23 to deploy above front surface 10 of body 9, corresponding to the operating position as shown in FIG. 3; stereocard "S" may then be slid stepwise in the bottom slideway so as to present successive pairs of views in line with windows 50, 51 formed in body 9 opposite eyepieces 30, 31 in the operating position. Observe that in the operating position center panel 21 carrying the eyepieces is parallel to front surface 10 of the body.

The focal length of the eyepieces is sufficiently long so that no adjustment is required in principle; however, it is possible, where necessary, to provide for adjustment of the eyepieces so as to be able, where appropriate, to carry out fine adjustment of their position, for example by providing a mobile means of mounting the eyepieces on center panel 21, by means of a movable ring or similar.

Also, the visible part of optical system support plate 16 and body 9 of the device, and in particular the front and back surfaces of the latter, may with benefit be used to accommodate inscriptions or other markings for advertising or communication purposes.

It will be understood that various changes in the details, materials and arrangements of parts, which have been herein described and illustrated in order to explain the nature of the invention, may be made by those skilled in the art within the principle and scope of the invention as expressed in the appended claims. For example, instead of tangs 42 cut out from the body it is possible to provide projecting pegs to cooperate with openings or depressions formed for this purpose in the stereocard. The pair of windows 50, 51 formed in body 9 to illuminate the pair of views in line with eyepieces 30, 31 may with advantage be covered by diffuser plates.

I claim:

1. A device for viewing a series of stereoscopic views disposed in pairs in columns on a card, said device comprising a generally flat quadrangular body having an axis of symmetry, a pair of windows in said body, means defining first and second pairs of channels on the front of said body disposed one on each side of said axis of symmetry, said first pair of channels being configured to enable said card to slide therein and said second pair of channels being superposed on said first pair of channels, a plate including a plurality of flat sections having edges transverse to said pairs of channels, adjacent sections being attached at adjoining transverse edges by hinges, one of said sections including two spaced eyepieces adapted to align with pairs of views in the respective columns of views, said second pair of channels being configured to enable at least part of said plate to slide therein, at least one section of said plate being slidable in said second pair of channels to move said one section to a deployed position in which said eyepieces lie in a plane parallel to and appropriately spaced from said front surface and opposite said windows, and a folded position in which all of said sections of said plate lie flat against the front of said body.

2. A device according to claim 1, wherein said body is rectangular and each of its longitudinal edges comprises a bead on which are formed said pairs of channels.

3. A device according to claim 1, wherein both of said pairs of channels are disposed on the same side of said body.

4. A device according to claim 1, wherein said transverse edges are parallel, and said sections comprise a center panel, two lateral panels adjacent said center panel and two end panels adjacent at least said lateral panels.

5. A device according to claim 4, wherein said one section including said eyepieces comprises said center panel.

6. A device according to claim 5, wherein said eyepieces are adjustable in position on said center panel.

7. A device according to claim 4, wherein one of said end panels is of appropriate width to slide in the channels of said second pair of channels, the other of said end panels is fixed to said body, and said center and lateral panels have a width slightly less than the distance separating the edges of the channels of said second pair of channels, so that they are not engaged therein.

8. A device according to claim 7, wherein said other of said end panels is fixed to said body within said channels of said second pair of channels.

9. A device according to claim 5, wherein said center panel has a central opening between said eyepieces and said opening extends partially into said lateral panels.

10. A device according to claim 1, wherein said body comprises means for positioning said card to permit viewing of a pair of views.

11. A device according to claim 10, wherein said positioning means comprise at least one protuberance on said body adapted to cooperate with depressions on said card between the views of each pair.

12. A device according to claim 11, wherein said positioning means comprise two protuberances.

13. A device according to claim 1, wherein said body is of an extruded plastics material cut to the appropriate length.

* * * * *